Patented July 15, 1941

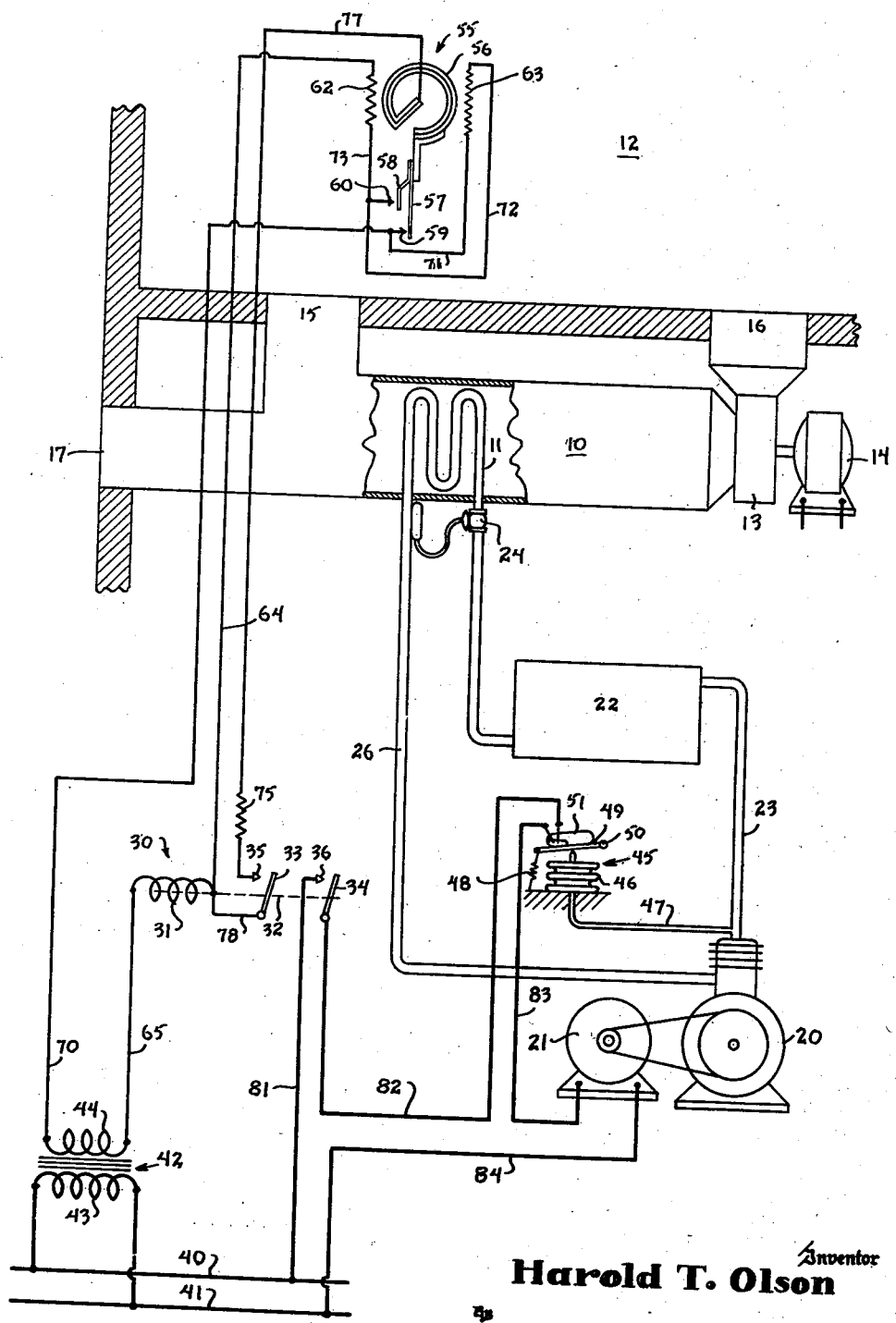

2,249,223

UNITED STATES PATENT OFFICE 2,249,223

TEMPERATURE CONTROL SYSTEM

Harold T. Olson, Minneapolis, Minn., assignor to Minneapolis-Honeywell Regulator Company, Minneapolis, Minn., a corporation of Delaware Application October 26, 1938, Serial No. 237,041

8 Claims. (Cl. 236—68)

This invention relates to a temperature control system and more particularly to a system for controlling a cooling apparatus for a space.

It is well known that in heating systems there is a definite time lag between the time that the heating apparatus is placed in operation and the arrival of the heat in the space. To compensate for this time lag in the heating system and to prevent overheating of the space, means have been provided adjacent the thermostat to raise the temperature thereof during the operation of the heating means in a manner to anticipate the arrival of heat in the space so that the residual heat in the system will not cause the temperature of the space to rise above the desired value. There is likewise a definite time lag and a certain amount of cooling stored in a cooling system so that if the cooling apparatus is controlled solely in accordance with the space temperature the temperature thereof is liable to drop below the desired value after the cooling apparatus has been stopped. It has heretofore been proposed to compensate for this by the use of heating means located in proximity to the space thermostat and arranged to maintain the temperature of the thermostat above the space temperature when the cooling means is not in operation, and to deenergize this heating means when the thermostat calls for cooling and the cooling apparatus is placed in operation.

Because of the fact that there is a considerable time lag between the time that the cooling means is placed in operation and the time that the space temperature actually starts to fall, if the heating means adjacent the thermostat is deenergized as soon as the cooling means is placed in operation the temperature at the thermostat may start to fall a considerable length of time prior to the time that the space temperature starts to fall so that the cooling means may be placed out of operation sooner than is desirable. This is particularly true where the cooling means for a building such as an office building or a factory that is not occupied at night, has been shut down for a considerable length of time, necessitating a lengthy operation of the cooling means in the morning to cause the space temperature to drop to the desired value. This situation is effectively provided for in accordance with the teachings of my invention by providing a heating means which causes the temperature at the thermostat to be maintained above the space temperature until such time as the temperature of the space actually starts to fall and to approach the desired value, indicating that the cooling apparatus is effective in reducing the temperature of the space whereupon the heating effect of the heating means is reduced to anticipate the reduction in temperature in the space so as to prevent the temperature of the space from falling below the desired value. This is done by providing a thermostat having a definite operating differential so that the cooling means is placed in operation when the temperature of the thermostat is at one predetermined value and the cooling means continues in operation until the temperature at the thermostat drops to a second predetermined value. When the temperature at the thermostat drops by reason of operation of the cooling means below the value at which operation of the cooling means is initiated, the heating means adjacent the thermostat is deenergized since the temperature of the space is falling and the cooling means is placed out of operation before the space temperature actually drops to the desired value so that the residual cooling effect of the cooling means will not cause the temperature of the space to fall below the desired value. In this manner the temperature of the space is maintained at a more nearly uniform value resulting in greater comfort to the occupants of the space.

It is accordingly an object of my invention to provide a control system for a cooling apparatus of the type set forth above wherein the drop in temperature in the space is anticipated by the controlling means for the cooling apparatus in a manner to provide maximum comfort conditions therein.

Other objects and advantages may become apparent upon a study of the specification, claims, and appended drawing wherein is illustrated diagrammatically one preferred form of my invention.

Referring more particularly to the drawing, an air conditioning chamber 10 having a cooling coil 11 therein is provided for conditioning the air in a space 12. A fan 13 driven by a motor 14 is provided for drawing air from the space 12 into the chamber 10 through the inlet duct 15 communicating with the space and discharging this air into the space through the outlet 16. Fresh air may also be introduced into the chamber 10 by means of the fresh air inlet 17 and the air passing through the chamber 10 comes in contact with the cooling coil 11 whereupon its temperature is reduced and the temperature of the space 12 is reduced thereby.

The cooling coil 11 may be provided with a suitable cooling medium and is illustrated as forming the evaporator of a direct expansion refrigeration system. This system is shown to include a compressor 20 driven by a motor 21 and having its outlet connected with the condenser 22 by means of the pipe 23, refrigerant flowing from the condenser 22 to the evaporator 11 under the control of a suitable expansion valve 24 which is here illustrated as being a thermostatic expansion valve of a type well known in the art, the refrigerant leaving the evaporator flowing through the pipe 26 back to the compressor 20.

The operation of the compressor motor 21 is controlled by a relay generally designated by the reference character 30, this relay including a relay coil 31 with which cooperates an armature 32 connected to the relay arms 33 and 34. These relay arms cooperate with fixed contacts 35 and 36 and when the relay coil 31 is energized the arms 33 and 34 are moved into engagement with the fixed contacts and upon deenergization of the coil 31 the arms move out of engagement with the fixed contacts under the influence of gravity or any suitable biasing means (not shown).

Line wires 40 and 41 are connected to a suitable source of power (not shown) and are provided for supplying power to the compressor motor 21 as well as to a step-down transformer 42 having a high tension primary 43 connected to the line wires 40 and 41 and a low tension secondary 44 which supplies power to the relay 30 and also to the heating elements located in proximity to the thermostat as will be hereinafter described.

The compressor motor 21 may also be controlled by a switch 45 which is designed to open the circuit to the motor 21 when the pressure on the discharge side of the compressor attains an excessive value. This switch 45 is shown to comprise a bellows 46 having its interior in communication with the discharge side of the compressor by means of a pipe 47. Biased by means of a spring 48 into engagement with the bellows is a lever 49 pivoted at 50 and carrying a mercury switch 51. When the pressure on the high pressure side of the compressor increases the bellows 46 expands and if this pressure rises sufficiently the switch 51 is moved thereby to circuit breaking position as is apparent from the drawing.

Located within the space 12 is a thermostat 55. This thermostat is shown to comprise a bimetallic element 56 carrying the contact arms 57 and 58, these contact arms cooperating with fixed contacts 59 and 60, respectively. As the temperature at the thermostat increases arm 57 moves into engagement with the contact 59 and upon a further increase in the space temperature the contact 58 will engage the fixed contact 60. The movable contacts will move away from the fixed contacts in reverse order as the temperature in the space 12 falls as will be readily apparent.

Located in close proximity to the bimetallic element 56 are a pair of heating elements 62 and 63. These elements, if desired, may be wound around the bimetallic element 56 or may be mounted in close proximity thereto in any suitable manner. The heating element 62 is of relatively low resistance compared to the heating element 63, the purpose for which will become apparent as the description proceeds.

With the parts in the positions illustrated the thermostat 55 is satisfied, or in other words, the movable contacts are both out of engagement with their respective fixed contacts since the space temperature is not above the desired value. The relay 30 is deenergized so that the circuit to the compressor motor is broken and the cooling system is shut down. Fan 13 is operating to circulate air to the space for ventilation purposes and if the evaporator 11 is cool as it will be immediately after the shut-down of the refrigeration system, cool air will be supplied to the space 12. The heaters 62 and 63 located adjacent the thermostat are energized at this time by means of the following circuit: from one side of the secondary 44 through conductors 70, 71, heater 63, conductors 72, 73, heater 62, conductor 64, relay coil 31, and conductor 65 to the other side of the secondary 44. Because of the high resistance in series with the relay coil 31, sufficient current does not flow through this relay coil at this time to cause the armature 32 to be attracted thereby to move the contact arms into engagement with their respective contacts. The heaters 62 and 63 supply a certain amount of heat to the thermostat and the temperature thereof is accordingly maintained above the temperature of the space 12. If the space temperature should now rise sufficiently to cause arm 57 of the thermostat to move into engagement with the contact 59 the above described circuits for the heater would not be changed nor would the relay 30 be energized at this time. Accordingly the space temperature must rise sufficiently high to cause the contact arm 58 of the thermostat to move into engagement with the contact 60.

Assuming now that the space temperature has risen sufficiently high to cause this engagement between contact 58 and contact 60, the relay coil 31 will be energized as follows: from one side of the secondary 44 through conductor 70, contact 59, thermostat arms 57 and 58, contact 60, conductor 73, resistance 62, conductor 64, relay coil 31, and conductor 65 to the other side of the secondary 44. The resultant engagement of relay arm 33 with contact 35 results in the establishment of a circuit parallel to the one just traced and which includes a resistance element 75, this circuit being as follows: from one side of secondary 44 through conductor 70, contact 59, arm 57, bimetal 56, conductor 77, resistance 75, contact 35, arm 33, conductor 78, relay coil 31, and conductor 65 to the other side of the secondary 44. Since the resistance 63 is shunted out the current now flows through two parallel paths, one of which includes the heater 62 and the other of which includes the resistance 75 and since resistance 75 will preferably be equal to the resistance 62 the current flow through the two paths will be substantially equal. The shunting out of the relatively high resistance 63 will increase the current flow through resistance 62. The resistance values of resistances 62 and 63 are so selected with respect to the impedance of relay coil 31 that the heat now given off by heater 62 will be the same as that given off by both heaters 62 and 63 when both heaters 62 and 63 were in series and the thermostat was satisfied. It should be noted that the parallel circuit through the resistance 75 is independent of contacts 58 and 60 and since this circuit includes the relay coil, the relay will remain energized until the circuit at contacts 57 and 59 is interrupted.

Energization of the relay 30 also causes arm 34 to move into engagement with contact 36 whereupon the compressor motor 21 is energized as follows: from the line wire 40 through conductor 81, contact 36, switch arm 34, conductor 82, mercury switch 51, conductor 83, motor 21, and conductor 84 to the line wire 41. Operation of the compressor now causes a flow of refrigerant through the evaporator 11 causing the temperature thereof to be reduced whereupon the temperature of the space 12 will likewise be reduced as will be apparent. The thermostat 55 will still be above the temperature of the space since there is a certain amount of heat being imparted thereto by the heating element 62 which is substantially the same as the heat originally imparted thereto by the heaters 62 and 63. Therefore the arms 57 and 58 carried thereby will move in direct accordance with variations in the space temperature at this time. After the space temperature starts to fall the contact 58 will move out of engagement with the contact 60 so that the only circuit through the relay 31 effective to adequately energize the same is the maintaining circuit controlled by the arm 33 and the contact 35 and which includes the resistance 75. The shunt circuit for the heater 63 is also broken at this time at contacts 58 and 60 of the thermostat so that the only circuit through heater 62 includes these two heaters in series, this circuit being the same circuit that was originally traced when the thermostat was satisfied. These two heaters will now be shunted by the resistance 75, however, and due to the low resistance value of resistance 75 as compared with the combined resistance values of heaters 62 and 63, the current flow through the heaters will be relatively small as compared with that through resistance 75. As a result, the heating effects of the heaters 62 and 63 will be reduced to a very low or negligible value as compared with that when the thermostat was satisfied and the heaters were not shunted or as compared with the case previously described in which the high resistance heater 63 was shunted out.

Since the heating effect of the thermostat heaters is now reduced considerably the temperature of the thermostat will fall more rapidly than the space temperature so that the arm 57 will move away from the fixed contact 59 before the temperature of the space has actually dropped to the desired value. When this happens the relay 30 is deenergized, interrupting operation of the compressor and breaking the circuit in parallel with the heaters 62 and 63 so that the current flow through these heaters is increased to the original value and the thermostat 55 is again heated up thereby. The evaporator 11 will be at a low temperature at this time and will have a considerable residual cooling effect so that the temperature of the air in the space may continue to fall after the compressor 20 stops operating. If the temperature fails to fall sufficiently the above cycle of operation will be repeated. If the values of the resistances, etc. is properly chosen however, in relation with the residual cooling capacity of the evaporator, the compressor will remain in operation sufficiently long as to cause the space temperature to drop to the desired value and the compressor will not operate again until there is an additional call for cooling by the space thermostat by reason of the cooling load on the system. In this manner the temperature of the space is prevented from falling below the desired value but since the heaters adjacent the thermostat are not deenergized or the current flow therethrough reduced until the temperature of the space has started to fall, the operation of the compressor will continue sufficiently long as to reduce the space temperature to the desired value.

While the actual relative values of the resistances may vary in accordance with the various type of apparatus employed I have found that where a relay requiring .35 ampere in order to pull in is employed with a 20 volt circuit the resistance 63 should have approximately twenty-four times the resistance value of each of the resistances 62 and 75 which are preferably chosen with the same resistance value. Obviously the amount of heat which should be imparted to the thermostat will vary in accordance with the particular type of system since the cooling lags of the various systems will differ and accordingly I have refrained from specifying any particular resistance values for the various resistances. Also while I have shown a cooling system in the form of a direct expansion type system it will be obvious that a brine system or an absorption system, or any other suitable form of cooling system may be employed for cooling the space 12. It will thus be seen that I have provided a control system for a cooling system wherein the drop in temperature in the space being cooled is anticipated in such a manner that the cooling system is placed out of operation or the cooling effect thereof is decreased at such a time as will cause the temperature in the space to be maintained at a substantially uniform value and wherein the danger of the temperature dropping below the desired value is substantially eliminated, but wherein the drop in temperature is not anticipated until the temperature actually starts to drop in the space so that short cycling of the cooling means will not take place during periods when the temperature of the space has been allowed to rise to a value considerably higher than that at which it is desired to maintain in the space.

Having described a preferred form of my invention, many modifications thereof may become apparent to those skilled in the art and it therefore should be understood that my invention is limited only by the scope of the appended claims.

I claim as my invention:

1. In a system of the class described, a space cooling means, thermostatic means in control of the space cooling means and having two pairs of contacts, said thermostatic means being arranged to increase the cooling effect of the cooling means when the temperature to which the thermostatic means is subjected rises to a predetermined value sufficient to cause engagement of a predetermined one of said pairs of contacts and to decrease the cooling effect of the cooling means only after the temperature to which the thermostatic means is subjected drops to a value sufficiently lower than the first mentioned predetermined value to cause a change in the circuit controlling position of the other pair of contacts, and means responsive to a drop in temperature in the space sufficient to cause separation of said predetermined one of said pairs of contacts for causing the temperature of the thermostatic means to drop more rapidly than the space temperature until the cooling effect of the cooling means is decreased whereby the cooling effect of the cooling means is decreased sooner than if the thermostatic means responded solely to changes in the space temperature.

2. In a system of the class described, thermostatic means having two pairs of contacts arranged to be sequentially engaged in response to increases in temperature of the thermostatic means, heating means located in close proximity and arranged to raise the temperature of the thermostatic means above the ambient temperature, means for normally maintaining said heating means at a high temperature, and means responsive to separation of the last to be engaged of said pairs of contacts after both pairs of contacts have been in engagement for causing a drop in temperature of the heating means until the other movable contact moves out of engagement with the cooperating fixed contact.

3. In a system of the class described, thermostatic means having two pairs of contacts arranged to be sequentially engaged in response to a rise in temperature at the thermostatic means, electrical heating means in close proximity to said thermostatic means and arranged to raise the temperature thereof above the ambient temperature, means for normally causing a high flow of current through said heating means, and means responsive to separation of the last to be engaged of said pairs of contacts after both pairs of contacts have been engaged for reducing the current flow through the heating means.

4. In a system of the class described, thermostatic means having a first contact movable into engagement with a fixed contact in response to a rise in temperature at the thermostatic means and a second contact movable into engagement with a fixed contact in response to a further rise in temperature at the thermostatic means, space cooling means controlled by said thermostatic means, means responsive to engagement of both movable contacts with the cooperating fixed contacts for causing an increase in the cooling effect of the cooling means, means maintaining this increase in the cooling effect of the cooling means until both movable contacts have been moved away from the cooperating fixed contacts, heating means in close proximity to said thermostatic means and arranged to raise the temperature thereof above the space temperature, and means responsive to movement of the second movable contact away from the cooperating fixed contact while the cooling effect of the cooling means is in the increased condition for reducing the heating effect of the heating means.

5. In a system of the class described, thermostatic means having a first contact movable into engagement with a fixed contact in response to a rise in temperature at the thermostatic means and a second contact movable into engagement with a fixed contact in response to a further rise in temperature at the thermostatic means, space cooling means controlled by said thermostatic means, means responsive to engagement of both movable contacts with the cooperating fixed contacts for causing operation of the cooling means, means for maintaining the cooling means in operation until both of the movable contacts have moved out of engagement with the cooperating fixed contacts, electrical heating means located in close proximity to said thermostatic means, means for normally causing a large flow of current through said heating means, and means for reducing the current flow through said heating means as long as the cooling means is in operation and one of the movable contacts is out of engagement with the cooperating fixed contact.

6. In a system of the class described, thermostatic means having a first contact movable into engagement with a fixed contact in response to a rise in temperature at the thermosatic means and a second contact movable into engagement with a fixed contact in response to a further rise in temperature at the thermostatic means, space cooling means controlled by said thermostatic means, means responsive to engagement of both movable contacts with the cooperating fixed contacts for causing operation of the cooling means, means for maintaining the cooling means in operation until both of the movable contacts have moved out of engagement with the cooperating fixed contacts, a pair of electrical heaters adjacent said thermostatic means, and circuit means operative when both said first and second contacts are out of engagement with the cooperating fixed contacts to cause energization of both of said heaters to an extent such that they deliver a predetermined amount of heat to said thermostatic means, said circuit means being operative when both contacts are in engagement with said fixed contacts to cause energization of only one of said heaters but to such an extent that it delivers said predetermined amount of heat to said thermostatic means, and said circuit means being operative when only said first contact is in engagement with its associated fixed contact and when said cooling means is in operation to cause energization of both heaters but with a reduced energization such that the total heat delivered thereby to said thermostatic means is relatively small as compared with said predetermined amount.

7. In a system of the class described, thermostatic means having a first contact movable into engagement with a fixed contact in response to a rise in temperature at the thermostatic means and a second contact movable into engagement with a fixed contact in response to a further rise in temperature at the thermostatic means, space cooling means controlled by said thermostatic means, means responsive to engagement of both movable contacts with the cooperating fixed contacts for causing operation of the cooling means, means for maintaining the cooling means in operation until both of the movable contacts have moved out of engagement with the cooperating fixed contacts, a pair of electrical heaters, a source of power, circuit connections independent of said thermostatic contacts for connecting said heaters in series to said source of power, a shunt circuit of negligible resistance around one of said heaters and controlled by the second contact, and a shunt circuit around both heaters in series and of much smaller resistance than said series connected heaters, said maintaining means being operative to maintain said last named shunt circuit after the second contact has separated from its fixed contact and until said first contact also separates from its fixed contact.

8. In a system of the class described, a space cooling means, thermostatic means in control of the space cooling means and having two pairs of contacts arranged to be sequentially engaged in response to increases in temperature of the thermostatic means, means for causing operation of said cooling means when both pairs of contacts are engaged until both pairs of contacts are disengaged, temperature changing means located in close proximity and arranged to change the temperature of the thermostatic means with respect to the ambient temperature, and means responsive to separation of the last to be engaged of said pairs of contacts after both pairs of contacts have been in engagement to change the effect of said temperature changing means so as to cause the temperature of the thermostatic means to drop more rapidly than the ambient temperature until the other movable contact moves out of engagement with the cooperating contact.

HAROLD T. OLSON.